(12) United States Patent
Choi et al.

(10) Patent No.: US 12,176,544 B2
(45) Date of Patent: Dec. 24, 2024

(54) NEGATIVE ELECTRODE AND SECONDARY BATTERY INCLUDING THE NEGATIVE ELECTRODE

(71) Applicant: LG ENERGY SOLUTION, LTD., Seoul (KR)

(72) Inventors: Hee Won Choi, Daejeon (KR); Je Young Kim, Daejeon (KR); Sang Wook Woo, Daejeon (KR); Li Lin Piao, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 691 days.

(21) Appl. No.: 17/423,744

(22) PCT Filed: Jan. 16, 2020

(86) PCT No.: PCT/KR2020/000831
§ 371 (c)(1),
(2) Date: Jul. 16, 2021

(87) PCT Pub. No.: WO2020/149681
PCT Pub. Date: Jul. 23, 2020

(65) Prior Publication Data
US 2022/0115667 A1    Apr. 14, 2022

(30) Foreign Application Priority Data
Jan. 17, 2019    (KR) .................. 10-2019-0006404

(51) Int. Cl.
| | | |
|---|---|---|
| *H01M 4/13* | (2010.01) | |
| *H01M 4/133* | (2010.01) | |
| *H01M 4/36* | (2006.01) | |
| *H01M 4/505* | (2010.01) | |
| *H01M 4/525* | (2010.01) | |
| *H01M 4/587* | (2010.01) | |
| *H01M 4/62* | (2006.01) | |
| *H01M 10/0525* | (2010.01) | |
| *H01M 4/02* | (2006.01) | |

(52) U.S. Cl.
CPC .......... *H01M 4/625* (2013.01); *H01M 4/133* (2013.01); *H01M 4/366* (2013.01); *H01M 4/505* (2013.01); *H01M 4/525* (2013.01); *H01M 4/587* (2013.01); *H01M 10/0525* (2013.01); *H01M 2004/021* (2013.01)

(58) Field of Classification Search
CPC ...... H01M 4/625; H01M 4/133; H01M 3/366; H01M 4/505; H01M 4/525; H01M 4/587; H01M 10/0525; H01M 2004/021
See application file for complete search history.

(56) References Cited

U.S. PATENT DOCUMENTS

| | | | |
|---|---|---|---|
| 2004/0247872 A1 | 12/2004 | Sudo et al. | |
| 2006/0134516 A1* | 6/2006 | Im .................... | H01M 10/0525 429/232 |
| 2006/0134616 A1 | 6/2006 | Im et al. | |
| 2008/0274406 A1 | 11/2008 | Fuse et al. | |
| 2014/0178764 A1 | 6/2014 | Park et al. | |
| 2014/0302394 A1* | 10/2014 | Yue .................... | C01B 32/05 427/113 |
| 2015/0132655 A1 | 5/2015 | Yuge et al. | |
| 2015/0194668 A1* | 7/2015 | Ueda .................... | H01M 4/625 252/182.1 |
| 2016/0043389 A1* | 2/2016 | Deguchi .............. | H01M 10/052 429/200 |
| 2016/0276657 A1* | 9/2016 | Song .................... | H01M 4/366 |
| 2017/0170465 A1* | 6/2017 | Kim .................... | H01M 4/366 |
| 2018/0006300 A1* | 1/2018 | Jeong .................. | H01M 4/622 |
| 2018/0006305 A1 | 1/2018 | Waki et al. | |
| 2018/0008300 A1 | 1/2018 | Jeong et al. | |
| 2018/0040875 A1 | 2/2018 | Kim et al. | |
| 2018/0090761 A1* | 3/2018 | Kim .................... | H01M 4/587 |

FOREIGN PATENT DOCUMENTS

| | | |
|---|---|---|
| CN | 1981393 A | 6/2007 |
| CN | 103247802 A | 8/2013 |
| CN | 107408698 A | 11/2017 |
| CN | 107546367 A | 1/2018 |

(Continued)

OTHER PUBLICATIONS

GR3555 Natural Flake Graphite, Stanford Advanced Materials, Feb. 8, 2024, https://www.samaterials.com/natural-flake-graphite.html (Year: 2024).*
Machine translation of KR2013015967 (Year: 2013).*
International Search Report for PCT/KR2020/000831 mailed on Apr. 28, 2020.
Amaraweera et al., "Surface modification of natural vein graphite for the anode application in Li-ion rechargeable batteries", Ionics, Kiel, DE, vol. 24, No. 11, Mar. 20, 2018, pp. 3423-3429.
Extended European Search Report for European Application No. 20741487.1, dated Feb. 23, 2022.

(Continued)

*Primary Examiner* — James M Erwin
*Assistant Examiner* — Ziheng Lu
(74) *Attorney, Agent, or Firm* — Birch, Stewart, Kolasch & Birch, LLP

(57) ABSTRACT

A negative electrode including a negative electrode active material layer including a negative electrode active material, wherein the negative electrode active material includes a core and a coating layer disposed on the core. The core includes natural graphite and an amorphous carbon layer on the natural graphite, wherein the natural graphite has an average particle diameter, $D_{50}$, of 10 μm to 14 μm.ONH The negative electrode active material includes 1,500 ppm wt % to 2,000 ppm wt % of oxygen, 200 ppm wt % to 300 ppm wt % of nitrogen, and 200 ppm wt % to 300 ppm wt % of hydrogen as measured by an ONH analysis, and the coating layer includes carbon nanofibers.

10 Claims, No Drawings

(56) References Cited

FOREIGN PATENT DOCUMENTS

| | | |
|---|---|---|
| CN | 105655542 A | 6/2018 |
| EP | 1 775 785 A1 | 4/2007 |
| JP | 2016-186913 A | 10/2016 |
| KR | 10-2004-0040473 A | 5/2004 |
| KR | 10-2006-0069738 A | 6/2006 |
| KR | 10-2008-0006898 A | 1/2008 |
| KR | 10-2010-0072160 A | 6/2010 |
| KR | 10-2013-0015967 A | 2/2013 |
| KR | 2013015967 A * | 2/2013 .......... H01M 10/052 |
| KR | 10-1309241 B1 | 9/2013 |
| KR | 10-2013-0107892 A | 10/2013 |
| KR | 10-2014-0081466 A | 7/2014 |
| KR | 10-1417588 B1 | 7/2014 |
| KR | 10-1419792 B1 | 7/2014 |
| KR | 10-1461220 B1 | 11/2014 |
| KR | 10-2014-0140952 A | 12/2014 |
| KR | 10-2016-0123244 A | 10/2016 |
| KR | 10-2017-0111748 A | 10/2017 |
| KR | 10-2018-0004426 A | 1/2018 |
| KR | 10-1913902 B1 | 10/2018 |

OTHER PUBLICATIONS

Wu et al., "Modified natural graphite as anode material for lithium ion batteries", Journal of Power Sources, Elsevier, Amsterdam, NL, vol. 111, No. 2, Sep. 23, 2002, pp. 329-334.

Zhao et al., "Modification of natural graphite for lithium ion batteries", Solid State Sciences, Elsevier, Paris, FR, vol. 10, No. 5, May 1, 2008, pp. 612-617.

\* cited by examiner

NEGATIVE ELECTRODE AND SECONDARY BATTERY INCLUDING THE NEGATIVE ELECTRODE

CROSS-REFERENCE TO RELATED APPLICATIONS

This application claims the benefit of Korean Patent Application No. 10-2019-0006404, filed on Jan. 17, 2019, in the Korean Intellectual Property Office, the disclosure of which is incorporated herein in its entirety by reference.

TECHNICAL FIELD

The present invention relates to a negative electrode and a secondary battery, the negative electrode including a negative electrode active material layer including a negative electrode active material, wherein the negative electrode active material includes a core and a coating layer disposed on the core, wherein the core includes natural graphite and an amorphous carbon layer, wherein the natural graphite has a $D_{50}$ of 10 μm to 14 μm, and when confirmed through an ONH analysis method, 1,500 ppm wt % to 2,000 ppm wt % of oxygen, 200 ppm wt % to 300 ppm wt % of nitrogen, and 200 ppm wt % to 300 ppm wt % of hydrogen are included in the negative electrode active material, and the coating layer includes carbon nanofiber.

BACKGROUND ART

Demands for the use of alternative energy or clean energy are increasing due to the rapid increase in the use of fossil fuel, and as a part of this trend, the most actively studied field is a field of electricity generation and electricity storage using an electrochemical reaction.

Currently, a typical example of an electrochemical device using such electrochemical energy is a secondary battery and the usage areas thereof are increasing more and more. In recent years, as technology development of and demand for portable devices such as portable computers, mobile phones, and cameras have increased, demands for secondary batteries as an energy source have been significantly increased. In general, a secondary battery is composed of a positive electrode, a negative electrode, an electrolyte, and a separator. The negative electrode includes a negative electrode active material for intercalating and de-intercalating lithium ions from the positive electrode, and as the negative electrode active material, a graphite-based active material, for example, natural graphite or artificial graphite may be used.

Meanwhile, natural graphite has an advantage in that the capacity of a battery may be increased. However, since natural graphite has a plurality of voids thereinside, at the time of roll-pressing during a negative electrode manufacturing process, the voids thereinside are blocked, causing the generation of stress in the natural graphite. Therefore, the rapid charging performance of the battery may be deteriorated. In addition, since the natural graphite has the plurality of internal voids, a side reaction between an electrolyte and the natural graphite is excessively generated, causing the excessive generation of gas in the battery. In addition, during charging and discharging of the battery, the volume of natural graphite is excessively increased. As a result, the high-temperature storage performance, high-temperature cycle performance and the like of the battery are degraded. In addition, when untreated natural graphite is used, the structure of the negative electrode is severely changed and lithium ion diffusion resistance is increased during charging and discharging of the battery, thereby causing a problem in which the rapid charging performance of the battery is deteriorated.

Typically, a technique in which an amorphous carbon coating layer is disposed on the natural graphite is used. The amorphous carbon coating layer is prepared through a pitch and the like. However, in this case, it is difficult to maintain a high charging and discharging capacity, and there is a problem in that the degree of improvement in the lifespan properties and rapid charging performance of the battery is not great.

Therefore, there is a demand for a new technology capable of improving the lifespan properties of a battery by suppressing a side reaction between natural graphite and an electrolyte and improving the rapid charging performance of the battery by increasing the mobility of lithium ions.

DISCLOSURE OF THE INVENTION

Technical Problem

An aspect of the present invention is to provide a negative electrode and a secondary battery including the same, the negative electrode capable of improving the lifespan properties of a battery by suppressing a side reaction between natural graphite and an electrolyte and improving the rapid charging performance of the battery by increasing the mobility of lithium ions.

Technical Solution

According to an aspect of the present invention, there is provided a negative electrode including a negative electrode active material layer having a negative electrode active material, wherein the negative electrode active material includes a core and a coating layer disposed on the core, wherein the core includes natural graphite and an amorphous carbon layer on the natural graphite, wherein the natural graphite has an average particle diameter, $D_{50}$, of 10 μm to 14 μm, and the negative electrode active material comprises 1,500 ppm wt % to 2,000 ppm wt % of oxygen, 200 ppm wt % to 300 ppm wt % of nitrogen, and 200 ppm wt % to 300 ppm wt % of hydrogen as measured by an ONH analysis method and the coating layer includes carbon nanofiber.

According to another aspect of the present invention, there is provided a secondary battery including the negative electrode.

Advantageous Effects

According to the present invention, a negative electrode active material included in a negative electrode includes a core containing natural graphite of an appropriate size, so that the lifespan properties and rapid charging performance of a battery may be improved. Also, the negative electrode active material has internal pores smaller than those of a typical negative electrode active material, thereby suppressing an electrolyte side reaction, and the movement path of lithium ions is shortened so that the rapid charging performance of the battery may be improved. Also, the volume expansion of the negative electrode active material is reduced, so that the lifespan properties of the battery may be improved. Furthermore, since carbon nanofibers are disposed on the core, the movement path of the lithium ions is shortened, so that the rapid charging performance of the battery may be improved. In addition, since a proper content of functional groups is disposed on the surface of the natural graphite, negative electrode adhesion is improved due to the hydrogen bonding force between the natural graphite and the carbon nanofiber, so that the lifespan properties of the battery may be improved.

MODE FOR CARRYING OUT THE INVENTION

Hereinafter, the present invention will be described in more detail to facilitate understanding of the present invention.

It will be understood that words or terms used in the present specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular exemplary embodiments only and is not intended to be limiting of the present invention. The terms of a singular form may include plural forms unless the context clearly indicates otherwise.

In the present specification, it should be understood that the terms "include," "comprise," or "have" are intended to specify the presence of stated features, numbers, steps, elements, or combinations thereof, but do not preclude the presence or addition of one or more other features, numbers, steps, elements, or combinations thereof.

In the present specification, $D_{50}$ may be defined as a particle diameter corresponding to 50% of the cumulative volume in the particle size distribution curve of particles. The $D_{50}$ be measured by, for example, a laser diffraction method. The laser diffraction method generally enables measurement of a particle diameter from a sub-micron region to several millimeters, so that results of high reproducibility and high resolution may be obtained.

<Negative Electrode>

A negative electrode according to an embodiment of the present invention includes a negative electrode active material layer including a negative electrode active material, wherein the negative electrode active material includes a core and a coating layer disposed on the core, wherein the core includes natural graphite and an amorphous carbon layer, wherein the natural graphite has an average particle diameter, $D_{50}$, of 10 μm to 14 μm, and when confirmed through an ONH analysis method, 1,500 ppm wt % to 2,000 ppm wt % of oxygen, 200 ppm wt % to 300 ppm wt % of nitrogen, and 200 ppm wt % to 300 ppm wt % of hydrogen are included in the negative electrode active material, and the coating layer includes carbon nanofiber.

The negative electrode may include a negative electrode active material layer, and specifically, may include a current collector and the above negative electrode active material layer.

The current collector is not particularly limited as long as it has conductivity without causing a chemical change in a battery. For example, as the current collector, copper, stainless steel, aluminum, nickel, titanium, fired carbon, or aluminum or stainless steel that is surface-treated with one of carbon, nickel, titanium, silver, and the like may be used. Specifically, a transition metal which adsorbs carbon well such as copper and nickel may be used as the current collector. The thickness of the current collector may be from 6 μm to 20 μm, but the thickness of the current collector is not limited thereto.

The negative electrode active material layer may be disposed on the current collector. The negative electrode active material layer may be disposed on at least one surface of the current collector, specifically on one surface or both surfaces thereof.

The negative electrode active material layer may include a negative electrode active material.

The negative electrode active material may include a core and a coating layer disposed on the core.

The core may include natural graphite and an amorphous carbon layer.

Since the natural graphite has a high capacity per weight, the capacity of a battery may be improved.

The natural graphite may be spherical natural graphite. The spherical natural graphite may be formed by modifying flaky natural graphite. Specifically, the spherical natural graphite may be formed by aggregated flaky natural graphite, and more specifically, the natural graphite may have a spherical shape or a shape close to a spherical shape in which the flaky natural graphite is curled.

The sphericity of the spherical natural graphite may be 0.92 to 0.97, specifically 0.93 to 0.96, more specifically 0.94 to 0.95. When the above range is satisfied, the negative electrode may be manufactured at a high density, and there is an effect in that negative electrode adhesive force (force preventing the negative electrode active material from being detached from the negative electrode) is improved.

The natural graphite may have an average particle diameter, $D_{50}$, of 10 μm to 14 μm, specifically 11 μm to 13 μm, more specifically 10.5 μm to 11.5 μm. When the $D_{50}$ of the natural graphite is less than 10 μm, the capacity of the negative electrode active material is excessively reduced and the specific surface area is excessively increased, so that it is difficult to implement a negative electrode having a high energy density. Also, a side reaction with an electrolyte is excessively generated, so that there is a problem in that the lifespan properties of the battery may be deteriorated. On the other hand, when the $D_{50}$ of the natural graphite is greater than 14 μm, the mobility of lithium ions (Li-ion mobility) is reduced so that the rapid charging performance and output performance of the battery are deteriorated.

The flaky natural graphite included in the natural graphite may have an average particle diameter, $D_{50}$, of 100 nm to 400 nm, specifically 200 nm to 300 nm, more specifically 240 nm to 270 nm. When the $D_{50}$ of the flaky natural graphite is less than 100 nm, the specific surface area of the natural graphite is excessively increased, thereby increasing a site causing a side reaction with an electrolyte, so that there is a problem in that the lifespan properties of the battery are deteriorated. On the other hand, when the $D_{50}$ of the flaky natural graphite is greater than 400 nm, the size of the natural graphite is excessively increased, so that it is difficult to obtain natural graphite having a uniform particle size distribution and when used in the battery, the rapid charging performance and output performance of the battery may be deteriorated.

In the core, a functional group may be present. Specifically, a functional group may be present on the surface of the natural graphite. The negative electrode adhesive force may be increased due to the functional group, and bonding force between the natural graphite and the carbon nanofibers may be increased. Accordingly, the mechanical stability of the electrode may be improved, so that the lifespan properties of the battery may be improved.

There may be oxygen, nitrogen, and hydrogen disposed on the surface of the natural graphite. The oxygen, nitrogen, and hydrogen may be atoms included in the functional group.

The oxygen may be included in the negative electrode active material in 1,500 ppm wt % to 2,000 ppm wt %, and specifically, may be included in 1,600 ppm wt % to 1,800 ppm wt %. The nitrogen may be included in the negative electrode active material in 200 ppm wt % to 300 ppm wt %, and specifically, may be included in 230 ppm wt % to 270 ppm wt %. The hydrogen may be included in the negative electrode active material in 200 ppm wt % to 300 ppm wt %, and specifically, may be included in 230 ppm wt % to 270 ppm wt %. When the above range is satisfied, negative electrode adhesive force may be improved due to the strong hydrogen bonding force between the functional group included in the natural graphite and a functional group of the carbon nanofiber. The above content range includes the content of a functional group which is necessarily included in carbon nanofibers and the content of a functional group located on the natural graphite. In the present invention, the content of the functional group located on the natural graphite is artificially controlled, so that a relatively high level of oxygen, nitrogen, and hydrogen content as described above may be derived. That is, the above content range is much higher than the contents of oxygen, nitrogen, and hydrogen in a negative electrode active material in which a carbon nanofiber coating layer is disposed on natural graphite which has not been subjected to a separate treatment. The contents of oxygen, nitrogen and hydrogen may be confirmed by an ONH analysis method in a negative electrode active material to be prepared.

The amorphous carbon layer may be located on the surface of the natural graphite. A carbonaceous precursor for forming an amorphous carbon layer is mixed with the flaky natural graphite, and a spherical natural graphite and an amorphous carbon layer are formed through processing. During the processing, the amorphous carbon layer may cover at least a portion of the surface of the spherical natural graphite. By the amorphous carbon layer, the output properties and rapid charging performance of the battery by the natural graphite may be improved.

The amorphous carbon layer may be included in the core in an amount of 2 wt % to 6 wt %, specifically 2.5 wt % to 5.5 wt %.

The coating layer may be disposed on the core. Specifically, the coating layer may cover at least a portion of the surface of the core, more specifically, the entire surface of the core.

The coating layer may include carbon nanofiber, and specifically, the coating layer may be composed of carbon nanofiber. Since the coating layer includes the carbon nanofiber, the conductivity of a negative electrode active material layer may be improved and the mobility of lithium ions may be improved, and due to strong hydrogen bonding between a functional group of the core and a functional group of the carbon nanofibers (specifically, 'between the functional group of the core and the functional group which is necessarily present in the coating layer'), negative electrode adhesive force may be improved.

The average diameter of the carbon nanofibers may be 200 nm to 400 nm, specifically 250 nm to 350 nm, more specifically 270 nm to 300 nm. When the above range is satisfied, a coating layer having an appropriate thickness and uniformity may be formed, so that while the initial efficiency is maintained, a uniform yet high lithium ion mobility may be derived. The average diameter represents an average value of 14 (a total of 15 carbon nanofibers having a large diameter) carbon nanofibers in descending order from a carbon nanofiber having the largest diameter and 14 (a total of 15 carbon nanofibers having a small diameter) carbon nanofibers in ascending order from a carbon nanofiber having the smallest diameter (a total of 30 carbon nanofibers), when observing the negative electrode active material as prepared by a Scanning Electron Microscope (SEM).

The coating layer may be included in the negative electrode active material in an amount of 3 wt % to 5 wt %, specifically 4 wt % to 4.5 wt %, more specifically, 4.1 wt % to 4.3 wt %. When the above range is satisfied, while the discharge capacity of the battery may be maintained at an appropriate level, an excessive deterioration in initial efficiency of the battery may be suppressed.

The thickness of the coating layer may be 200 nm to 400 nm, specifically 250 nm to 350 nm, more specifically 270 nm to 300 nm. When the above range is satisfied, a thin and uniform coating layer is formed, so that the mobility of lithium ions may be increased.

The negative electrode active material may have a pore volume of 10 cm$^3$/g to 15 cm$^3$/g, specifically 11 cm$^3$/g to 13 cm$^3$/g, more specifically, 11.5 cm$^3$/g to 12.5 cm$^3$/g. The pore volume is mainly affected by the total volume of pores present in the inside and on the surface of the core. It was possible to satisfy the above range since a technique of applying pressure to the core to control internal pores of the core was accompanied. Therefore, the pore volume of the negative electrode active material may be smaller than the pore volume of a typical negative electrode active material to which such a technique has not been applied. When the above pore volume range is satisfied, the number of internal pores is reduced, thereby shortening the path through which lithium ions move, so that the rapid charging performance of the battery may be improved. In addition, the volume expansion of the negative electrode is suppressed to improve the lifespan properties of the negative electrode.

Although not limited thereto, the negative electrode active material may be prepared in the following manner. A method for preparing the negative electrode active material may include preparing a core containing natural graphite having an average particle diameter, $D_{50}$, of 10 μm to 14 μm, removing internal pores of the core, and disposing a coating layer including carbon nanofibers on the core.

In preparing the core, the core may include natural graphite and an amorphous carbon layer as described above. The natural graphite may be formed by modifying flaky natural graphite. The natural graphite may be prepared by spheroidizing the flaky natural graphite by rolling or aggregating the flaky natural graphite. At this time, the flaky natural graphite may have an average particle diameter, $D_{50}$, of 100 nm to 400 nm. The $D_{50}$ of the natural graphite prepared by the above spherization process may be 10 μm to 14 μm. In addition, the flaky natural graphite may be mixed with a carbonaceous precursor in the spherization process, and the carbonaceous precursor may be located on the surface of the natural graphite in the end.

Natural graphite prepared by the spherization process may be subjected to an acid treatment process. Not only the acid treatment may increase the purity of natural graphite, but the acid treatment may also drive the contents of oxygen, nitrogen, and hydrogen of the negative electrode active material in addition to a spherization process and an internal pore control step.

In removing the internal pores of the core, as a method for removing the internal pores may be performed by a method for filling internal pores with a pitch, cold isostatic pressing, and the like. The pore volume of the negative electrode active material prepared through the above may be 10 cm³/g to 15 cm³/g. Since the specific surface area of the negative electrode active material and the like are controlled by the spherization process, the acid treatment, and the internal pore control step, the aforementioned contents of oxygen, nitrogen, and hydrogen in the above-described embodiment may be derived.

In disposing a coating layer including carbon nanofibers on the core, the carbon nanofibers and the coating layer are the same as the carbon nanofibers and the coating layer of the above-described embodiment.

Since a negative electrode active material prepared by the method is the same as the negative electrode active material described above, a detailed description of the structure thereof will be omitted.

The negative electrode may further include at least one of a binder and a conductive material.

The binder may include at least any one selected from the group consisting of a polyvinylidene fluoride-hexafluoropropylene copolymer (PVDF-co-HFP), polyvinylidenefluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, an ethylene-propylene-diene monomer (EPDM), a sulfonated EPDM, styrene-butadiene rubber (SBR), fluorine rubber, polyacrylic acid, materials having the hydrogen thereof substituted with Li, Na, or Ca, and the like. In addition, the binder may include various copolymers thereof.

The conductive material is not particularly limited as long as it has conductivity without causing a chemical change in the battery. For example, graphite such as natural graphite or artificial graphite; a carbon-based material such as acetylene black, Ketjen black, channel black, furnace black, lamp black, and thermal black; conductive fibers such as carbon fibers and metal fibers; a conductive tube such as a carbon nanotube; metal powder such as fluorocarbon powder, aluminum powder, and nickel powder; a conductive whisker such as zinc oxide and potassium titanate; a conductive metal oxide such as titanium oxide; a conductive material such as a polyphenylene derivative, and the like may be used.

The pore resistance of the negative electrode may be 5Ω to 10Ω, specifically 6Ω to 8Ω, more specifically 6.3Ω to 7.0Ω. When the above range is satisfied, the rapid charging performance and output performance of the battery may be improved. The pore resistance may be achieved on the basis that carbon nanofibers are uniformly and strongly coupled to the natural graphite.

<Secondary Battery>

A secondary battery according to another embodiment of the present invention may include a negative electrode, and the negative electrode may be the same as the negative electrode of the embodiment described above.

Specifically, the secondary battery may include the negative electrode, a positive electrode, a separator interposed between the positive electrode and the negative electrode, and an electrolyte. The negative electrode is the same as the negative electrode described above. Since the negative electrode has been described above, a detailed description thereof will be omitted.

The positive electrode may include a positive electrode current collector, and a positive electrode active material layer formed on the positive electrode current collector and including the positive electrode active material.

In the positive electrode, the positive electrode current collector is not particularly limited as long as it has conductivity without causing a chemical change in the battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 μm to 500 μm, and microscopic irregularities may be formed on the surface of the positive electrode current collector to improve the adhesion of the positive electrode active material. For example, the positive electrode current collector may be used in various forms such as a film, a sheet, a foil, a net, a porous body, a foam, and a non-woven body.

The positive electrode active material may be a positive electrode active material commonly used in the art. Specifically, the positive electrode active material may be a layered compound such as a lithium cobalt oxide ($LiCoO_2$) and a lithium nickel oxide ($LiNiO_2$), or a compound substituted with one or more transition metals; a lithium iron oxide such as $LiFe_3O_4$; a lithium manganese oxide such as $Li_{1+c1}Mn_{2-c1}O_4$ ($0 \leq c1 \leq 0.33$), $LiMnO_3$, $LiMn_2O_3$, and $LiMnO_2$; lithium copper oxide ($Li_2CuO_2$); a vanadium oxide such as $LiV_3O_8$, $V_2O_5$, and $Cu_2V_2O_7$; a Ni-site type lithium nickel oxide represented by the formula $LiNi_{1-c2}M_2O_2$ (wherein M is any one of Co, Mn, Al, Cu, Fe, Mg, B or Ga, and $0.01 \leq c2 \leq 0.3$); a lithium manganese composite oxide represented by the formula $LiMn_{2-c3}M_{c3}O_2$ (wherein, M is any one of Co, Ni, Fe, Cr, Zn, or Ta, and $0.01 \leq c3 \leq 0.1$), or by the formula $Li_2Mn_3MO_8$ (wherein, M is any one of Fe, Co, Ni, Cu, or Zn); $LiMn_2O_4$ having a part of Li in the formula substituted with an alkaline earth metal ion, and the like, but is not limited thereto. The positive electrode may be a Li-metal.

The positive electrode active material layer may include a positive electrode conductive material and a positive electrode binder, together with the positive electrode active material described above.

At this time, the positive electrode conductive material is used to impart conductivity to an electrode, and any positive electrode conductive material may be used without particular limitation as long as it has electronic conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, and carbon fibers; metal powder or metal fibers of such as copper, nickel, aluminum, and silver; a conductive whisker such as a zinc oxide whisker and a potassium titanate whisker; a conductive metal oxide such as titanium oxide; or a conductive polymer such as a polyphenylene derivative, and any one thereof or a mixture of two or more thereof may be used.

In addition, the positive electrode binder serves to improve the bonding between positive electrode active material particles and the adhesion between the positive electrode active material and the positive electrode current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used.

The separator is to separate the negative electrode and the positive electrode and to provide a movement path for lithium ions. Any separator may be used without particular limitation as long as it is a separator commonly used in a secondary battery. Particularly, a separator having excellent moisture-retention of an electrolyte as well as low resistance to ion movement in the electrolyte is preferable. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, or polyethylene terephthalate fiber, and the like may be used as the separator. Also, a coated separator including a ceramic component or a polymer material may be used to secure heat resistance or mechanical strength, and may be selectively used having a single layered or a multi-layered structure.

The electrolyte may be an organic liquid electrolyte, an inorganic liquid electrolyte, a solid polymer electrolyte, a gel-type polymer electrolyte, a solid inorganic electrolyte, a molten-type inorganic electrolyte, and the like, which may be used in the preparation of a lithium secondary battery, but is not limited thereto.

Specifically, the electrolyte may include a non-aqueous organic solvent and a lithium salt.

As the non-aqueous organic solvent, for example, an aprotic organic solvent, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate may be used.

In particular, among the carbonate-based organic solvents, cyclic carbonates ethylene carbonate and propylene carbonate may be preferably used since they are organic solvents of a high viscosity having high permittivity to dissociate a lithium salt well. Furthermore, such a cyclic carbonate may be more preferably used since the cyclic carbonate may be mixed with a linear carbonate of a low viscosity and low permittivity such as dimethyl carbonate and diethyl carbonate in an appropriate ratio to prepare an electrolyte having a high electric conductivity.

As the metal salt, a lithium salt may be used. The lithium salt is a material which is easily dissolved in the non-aqueous electrolyte. For example, as an anion of the lithium salt, one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used.

In the electrolyte, in order to improve the lifespan properties of a battery, to suppress the decrease in battery capacity, and to improve the discharge capacity of the battery, one or more additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, and the like may be further included other than the above electrolyte components.

According to yet another embodiment of the present invention, a battery module including the secondary battery as a unit cell, and a battery pack including the same are provided. The battery module and the battery pack include the secondary battery which has high capacity, high rate properties, and cycle properties, and thus, may be used as a power source of a medium-and-large sized device selected from the group consisting of an electric vehicle, a hybrid electric vehicle, a plug-in hybrid electric vehicle, and a power storage system.

Hereinafter, preferred embodiments of the present invention will be described in detail to facilitate understanding of the present invention. However, the embodiments are merely illustrative of the present invention, and thus, it will be apparent to those skilled in the art that various modifications and variations can be made without departing from the scope and spirit of the present invention as disclosed in the accompanying claims. It is obvious that such variations and modifications fall within the scope of the appended claims.

EXAMPLES AND COMPARATIVE EXAMPLES

Example 1: Manufacturing of Negative Electrode

A negative electrode active material including a core and a coating layer (thickness 285 nm) disposed on the core and containing carbon nanofibers (average diameter: 285 nm) was used. The core was formed by sphericalizing flaky natural graphite ($D_{50}$: 250 nm), subjecting the sphericalized flaky natural graphite to an acid treatment, and then controlling the internal pore volume thereof by a CIP process, and included natural graphite (Sphericity 0.95, $D_{50}$: 11 μm) and an amorphous carbon layer (4 wt %) disposed on the sphericalized natural graphite. The negative electrode active material includes oxygen, nitrogen, and hydrogen, and in the negative electrode active material, the content of oxygen was 1,700 ppm wt %, the content of nitrogen was 250 ppm wt %, and the content of hydrogen was 250 ppm wt %. The coating layer was included in the negative electrode active material in an amount of 4.2 wt %. The pore volume of the negative electrode active material was 13 $cm^3/g$ (the internal pore volume was controlled by a CIP process).

The negative electrode active material, Super C65 as a conductive material, styrene butadiene rubber (SBR) as a binder, and carboxymethylcellulose (CMC) as a thickening agent were mixed in a weight ratio of 96.6:1:1.3:1.1, and then added with water to prepare a negative electrode slurry. The negative electrode slurry was applied on a copper foil (current collector) and then vacuum-dried for 10 hours at 130° C. to manufacture a negative electrode (1.4875 $cm^2$) of Example 1. The manufactured negative electrode had a loading amount of 3.61 $mAh/cm^2$. The pore resistance of the negative electrode was 6.5Ω.

Example 2: Manufacturing of Negative Electrode

A negative electrode was manufactured in the same manner as in Example 1 except that the natural graphite included in the core was natural graphite ($D_{50}$: 12 μm) in which flaky natural graphite ($D_{50}$: 400 nm) has been modified and sphericalized (Sphericity 0.95).

Example 3: Manufacturing of Negative Electrode

A negative electrode was manufactured in the same manner as in Example 1 except that the content of the oxygen (based on the total negative electrode active material) was 2,000 ppm wt %.

Example 4: Manufacturing of Negative Electrode

A negative electrode was manufactured in the same manner as in Example 1 except that the average diameter of the carbon nanofibers was 315 nm.

Example 5: Manufacturing of Negative Electrode

A negative electrode was manufactured in the same manner as in Example 1 except that the natural graphite in the core was sphericalized natural graphite having $D_{50}$: 14 μm, the carbon nanofibers having an average diameter of 270 nm were used, and the pore resistance of the negative electrode was 7.5Ω.

Comparative Example 1: Manufacturing of Negative Electrode

A negative electrode was manufactured in the same manner as in Example 1 except that the content of the oxygen (based on the total negative electrode active material) was 2,500 ppm wt %.

Comparative Example 2: Manufacturing of Negative Electrode

A negative electrode was manufactured in the same manner as in Example 1 except that the content of the oxygen (based on the total negative electrode active material) was 1,200 ppm wt %.

Comparative Example 3: Manufacturing of Negative Electrode

A negative electrode was manufactured in the same manner as in Example 1 except that the content of the nitrogen (based on the total negative electrode active material) was 330 ppm wt %.

Comparative Example 4: Manufacturing of Negative Electrode

A negative electrode was manufactured in the same manner as in Example 1 except that the content of the nitrogen (based on the total negative electrode active material) was 180 ppm wt %.

Comparative Example 5: Manufacturing of Negative Electrode

A negative electrode was manufactured in the same manner as in Example 1 except that the content of the hydrogen (based on the total negative electrode active material) was 330 ppm wt %.

Comparative Example 6: Manufacturing of Negative Electrode

A negative electrode was manufactured in the same manner as in Example 1 except that the content of the hydrogen (based on the total negative electrode active material) was 180 ppm wt %.

Comparative Example 7: Manufacturing of Negative Electrode

A negative electrode was prepared in the same manner as in Example 1 except that a negative electrode active material below was used as the negative electrode active material.

Negative electrode active material: A negative electrode active material including natural graphite ($D_{50}$: 9 μm) in which flaky natural graphite ($D_{50}$: 250 nm) was modified and sphericalized (Sphericity 0.80) and an amorphous carbon layer (4 wt %) disposed on the natural graphite.

Comparative Example 8: Manufacturing of Negative Electrode

A negative was prepared in the same manner as in Example 1 except that a negative electrode active material below was used as the negative electrode active material.

Negative electrode active material: A negative electrode active material including natural graphite ($D_{50}$: 11 μm) in which flaky natural graphite ($D_{50}$: 250 nm) was modified and sphericalized (Sphericity 0.92) and a pitch-derived amorphous carbon layer (a thickness 285 nm, 4.5 wt %) on the natural graphite.

Comparative Example 9: Manufacturing of Negative Electrode

A negative electrode was manufactured in the same manner as in Example 1 except that a negative electrode active material including natural graphite ($D_{50}$: 8 μm) in which flaky natural graphite ($D_{50}$: 30 nm) was modified and sphericalized (Sphericity 0.92) and an amorphous carbon layer (4 wt %) disposed on the natural graphite was used.

Comparative Example 10: Manufacturing of Negative Electrode

A negative electrode was manufactured in the same manner as in Example 1 except that a negative electrode active material including natural graphite ($D_{50}$: 17 μm) in which flaky natural graphite ($D_{50}$: 750 nm) was modified and sphericalized (Sphericity 0.92) and an amorphous carbon layer (4 wt %) disposed on the natural graphite was used.

TABLE 1

|  | $D_{50}$ (μm) of spherical natural graphite | Oxygen content (ppm wt %) | Nitrogen content (ppm wt %) | Hydrogen content (ppm wt %) | Pore volume (cm³/g) | Average diameter of carbon nanofibers (nm) | Pore resistance (Ω) |
|---|---|---|---|---|---|---|---|
| Example 1 | 11 | 1,700 | 250 | 250 | 13 | 285 | 6.5 |
| Example 2 | 12 | 1,700 | 250 | 250 | 13 | 285 | 6.5 |
| Example 3 | 11 | 2,000 | 250 | 250 | 13 | 285 | 6.5 |
| Example 4 | 11 | 1,700 | 250 | 250 | 13 | 315 | 7.0 |
| Example 5 | 14 | 1,700 | 250 | 250 | 13 | 270 | 7.5 |
| Comparative Example 1 | 11 | 2,500 | 250 | 250 | 17 | 285 | 8.5 |
| Comparative Example 2 | 11 | 1,200 | 250 | 250 | 17 | 285 | 8.5 |
| Comparative Example 3 | 11 | 1,700 | 330 | 250 | 17 | 285 | 8.5 |
| Comparative Example 4 | 11 | 1,700 | 180 | 250 | 17 | 285 | 8.5 |
| Comparative Example 5 | 11 | 1,700 | 250 | 330 | 17 | 285 | 8.5 |
| Comparative Example 6 | 11 | 1,700 | 250 | 180 | 17 | 285 | 8.5 |
| Comparative Example 7 | 9 | 1,500 | 230 | 180 | 18 | — | 8.5 |
| Comparative Example 8 | 11 | 1,300 | 170 | 120 | 23 | — | 8.5 |
| Comparative Example 9 | 8 | 1,700 | 250 | 250 | 23 | 285 | 8.5 |
| Comparative Example 10 | 17 | 1,700 | 250 | 250 | 23 | 285 | 8.5 |

The contents of oxygen, nitrogen, and hydrogen are based on a negative electrode active material, and was measured by an ONH analysis method. The $D_{50}$ was measured by a Microtrac PSD device. After preparing a coin cell using the negative electrode of each of Examples and Comparative Examples as two electrodes, 200 μl of an electrolyte solution was added to the coin cell and the mixture was left to stand for 30 hours, and then Electrochemical Impedance Spectroscopy (EIS) was measured (using Solartron Analytical's EIS equipment) to evaluate the pore resistance of Table 1.

Experimental Example 1: Evaluation of Volume Expansion of Battery and Capacity Retention Rate of Battery Using the negative electrode of each of Examples 1 to and Comparative Examples 1 to 10, a battery was manufactured in the following manner.

A positive electrode active material LCO, a carbon black-based conductive material, and a binder PVDF powder were mixed with a solvent N-methyl-2 pyrrolidone at a weight ratio of 92:2:6 to prepare a positive electrode slurry.

The prepared positive electrode slurry was applied on a positive electrode current collector having a thickness of 15 μm such that an electrode loading (mg/cm²) is 23.4 mg per unit area, dried in a vacuum oven at 120° C. for 10 hours, and then roll-pressed at a pressure of 15 MPa between rolls heated to 80° C. manufacture a positive electrode having a final thickness (current collector+active material layer) of 74.0 μm.

The negative electrode and the positive electrode manufactured above and a porous polyethylene separator were assembled using a stacking method, and the assembled battery was injected with an electrolyte (ethylene carbonate (EC)/ethyl methyl carbonate (EMC)=1/4 (volume ratio), lithium hexa fluoro phosphate (1 mole/L of $LiPF_6$), vinylidene carbonate (VC) having a content of 0.5 wt % based on the electrolyte) to manufacture a lithium secondary battery.

For the manufactured battery, the charge range from SOC 0% to SOC 95% was determined, and the battery was charged and discharged at a current rate of 0.1 C for the first cycle, at a current rate of 0.2 C for the second cycle, and charged and discharged at 0.5 C from the third cycle to the 30th cycle, and then the thickness change of the negative electrode was calculated by the following equation.

Thickness change rate of negative electrode (%)= [(thickness of negative electrode after 30th cycle)/initial thickness of negative electrode]× 100

Capacity retention rate was based on the first cycle discharge capacity of 100%, and the capacity retention rate was evaluated from the discharge capacity of 30 cycles.

Experimental Example 2: Evaluation of Rapid Charging Performance of Battery

Using the negative electrode of each of Examples 1 to and Comparative Examples 1 to 10, a battery was manufactured in the following manner.

A lithium (Li) metal thin film cut into a circular shape of 1.7671 cm² was prepared as a positive electrode. A porous polyethylene separator was interposed between the positive electrode and the negative electrode and was injected with an electrolyte solution (ethylene carbonate (EC)/ethyl methyl carbonate (EMC)=1/4 (volume ratio), lithium hexa fluoro phosphate (1 mole/L of $LiPF_6$), vinylidene carbonate (VC) having a content of 0.5 wt % based on the electrolyte solution) to manufacture a lithium coin half-cell.

The manufactured half-cell was charged with CC/CV (current rate of 0.2 C, 5 mV, 0.005 C current cut-off) and then discharged to 1.0 V with CC. The above was repeated for three times, and then, while performing charging for 15 minutes in a CC mode (3 C) based on the discharge capacity after the third cycle of 1 C, the output voltage according to SOC change was represented with a graph (see FIG. 2). The X-axis shows SOC and the Y-axis shows the measured output voltage in the graph, and using a method for determining Li plating SOC by locating a slope change point through a dV/dQ derivative. rapid charging performance was evaluated.

TABLE 2

| | Thickness change rate of negative electrode (%) | Capacity retention rate (%) after 30$^{th}$ cycle discharge (%) | 1.5 C Li plating (SOC %) |
|---|---|---|---|
| Example 1 | 21.2 | 94.8 | 48 |
| Example 2 | 21.5 | 94.2 | 46 |
| Example 3 | 21.8 | 93.6 | 45 |
| Example 4 | 22.1 | 93.1 | 43 |
| Example 5 | 22.3 | 92.9 | 42 |
| Comparative Example 1 | 29.6 | 85.4 | 34 |
| Comparative Example 2 | 30.3 | 85.1 | 31 |
| Comparative Example 3 | 30.5 | 84.9 | 29 |
| Comparative Example 4 | 31.8 | 84.6 | 30 |
| Comparative Example 5 | 31.7 | 83.7 | 28 |
| Comparative Example 6 | 32.5 | 83.4 | 25 |
| Comparative Example 7 | 32.7 | 82.9 | 20 |
| Comparative Example 8 | 32.5 | 82.6 | 23 |
| Comparative Example 9 | 33.9 | 81.4 | 22 |
| Comparative Example 10 | 35.6 | 80.5 | 24 |

The invention claimed is:

1. A negative electrode comprising:
a negative electrode active material layer comprising a negative electrode active material,
wherein the negative electrode active material comprises a core and a coating layer disposed on the core,
wherein the core comprises natural graphite and an amorphous carbon layer on the natural graphite,
wherein the natural graphite has an average particle diameter, $D_{50}$, of 10 μm to 14 μm, and
the negative electrode active material comprises 1,500 ppm to 2,000 ppm, by weight, of oxygen, 200 ppm to 300 ppm, by weight, of nitrogen, and 200 ppm to 300 ppm, by weight, of hydrogen as measured by an ONH analysis method, and
the coating layer comprises carbon nanofibers.

2. The negative electrode of claim 1, wherein the negative electrode active material has a pore volume of 10 cm$^3$/g to 15 cm$^3$/g.

3. The negative electrode of claim 1, wherein the natural graphite is spherical flaky natural graphite is aggregated in the shape of a sphere.

4. The negative electrode of claim 3, wherein the flaky natural graphite has an average particle diameter, $D_{50}$, of 100 nm to 400 nm.

5. The negative electrode of claim 1, wherein the natural graphite is spherical natural graphite, and
wherein the spherical natural graphite has a sphericity of 0.92 to 0.97.

6. The negative electrode of claim 1, wherein the carbon nanofibers have an average diameter of 200 nm to 400 nm.

7. The negative electrode of claim 1, wherein the coating layer is present in the negative electrode active material layer in an amount of 3 wt % to 5 wt %.

8. The negative electrode of claim 1, wherein the coating layer has a thickness of 200 nm to 400 nm.

9. The negative electrode of claim 1, having a pore resistance of 5Ω to 10 Ω.

10. A secondary battery comprising the negative electrode of claim 1.

* * * * *